(12) United States Patent
Liu et al.

(10) Patent No.: US 11,947,251 B2
(45) Date of Patent: Apr. 2, 2024

(54) ILLUMINATION SYSTEM AND PROJECTION APPARATUS

(71) Applicant: Coretronic Corporation, Hsin-Chu (TW)

(72) Inventors: Chi-Fu Liu, Hsin-chu (TW); Tsung-Hsin Liao, Hsin-Chu (TW); Chun-Li Chen, Hsinchu (TW); Hung-Yu Lin, Hsin-chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/701,680

(22) Filed: Mar. 23, 2022

(65) Prior Publication Data

US 2022/0308436 A1  Sep. 29, 2022

(30) Foreign Application Priority Data

Mar. 23, 2021 (CN) .......................... 202120587249.2

(51) Int. Cl.
*G03B 21/20* (2006.01)
*G02B 27/10* (2006.01)
*G03B 21/14* (2006.01)

(52) U.S. Cl.
CPC ..... *G03B 21/2066* (2013.01); *G02B 27/1006* (2013.01); *G03B 21/142* (2013.01); *G03B 21/206* (2013.01); *G03B 21/2033* (2013.01)

(58) Field of Classification Search
None
See application file for complete search history.

(56) References Cited

U.S. PATENT DOCUMENTS

2017/0075203 A1* 3/2017 Cheng .................. H04N 9/3158
2021/0191138 A1* 6/2021 Zhai ..................... G02B 27/149

FOREIGN PATENT DOCUMENTS

| CN | 102262342 | 2/2013 |
| CN | 106523955 | 10/2019 |
| TW | 200842478 | 11/2008 |

* cited by examiner

*Primary Examiner* — Bao-Luan Q Le
*Assistant Examiner* — Danell L Owens
(74) *Attorney, Agent, or Firm* — JCIPRNET

(57) ABSTRACT

An illumination system provides an illumination beam and includes a red light source, a green light source, a blue light source, a first supplementary light source, a first X-shaped light-splitting assembly, a first light-splitting element, and a light-uniforming element. The red light source provides a red beam. The green light source provides a green beam. The blue light source provides a blue beam. The first supplementary light source provides a first supplementary beam. The first X-shaped light-splitting assembly guides the first supplementary beam and the blue beam to the first light-splitting element. The first light-splitting element guides the red beam, the green beam, the blue beam, and the first supplementary beam to the light-uniforming element. The first supplementary beam is a red supplementary beam or a blue supplementary beam, and the illumination system includes at least five light-emitting elements. A projection apparatus including the above illumination system is also provided.

18 Claims, 8 Drawing Sheets

ILLUMINATION SYSTEM AND PROJECTION APPARATUS

CROSS-REFERENCE TO RELATED APPLICATION

This application claims the priority benefit of China application serial no. 202120587249.2, filed on Mar. 23, 2021. The entirety of the above-mentioned patent application is hereby incorporated by reference herein and made a part of this specification.

BACKGROUND

Technical Field

The disclosure relates to an optical system and an electronic device, and particularly relates to an illumination system and a projection apparatus.

Description of Related Art

A projection apparatus is a display device for generating a large-sized image. With the evolution and innovation of science and technology, the projection apparatus has been continuously improved. An imaging principle of the projection apparatus is to convert an illumination beam generated by an illumination system into an image beam via a light valve, and then project the image beam onto a projection target object (for example, a screen or a wall) through a projection lens to form a projection image.

In addition, with requirements from the market for the brightness, color saturation, service life, and non-toxicity/environmental friendliness of the projection apparatus, the light source of the illumination system has also evolved from an ultra-high-performance lamp (UHP lamp), a light-emitting diode (LED), to the currently most advanced laser diode (LD). In current light-combining systems, in order to increase the brightness, blue light emitted by an additionally provided blue light source is used to excite green light. However, this approach will make the overall green color energy ratio high, which will result in a green tinted image. In addition, in order to balance the color of light in the illumination system, the red light and blue light currents will be increased, which results in a temperature increase. As red light is more sensitive to heat, saturation is likely to occur and cause the overall conversion efficiency to decline.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides an illumination system and a projection apparatus, which can improve the brightness and color quality of the illumination system.

Other purposes and advantages of the disclosure may be further understood from the technical features disclosed in the disclosure.

To achieve one, part, or all of the above-mentioned purposes or other purposes, the disclosure provides an illumination system configured to provide an illumination beam. The illumination system includes a red light source, a green light source, a blue light source, a first supplementary light source, a first X-shaped light-splitting assembly, a first light-splitting element, and a light-uniforming element. The red light source provides a red beam. The green light source provides a green beam. The blue light source provides a blue beam. The first supplementary light source provides a first supplementary beam. The first X-shaped light-splitting assembly guides the first supplementary beam and the blue beam to be transmitted to the first light-splitting element. The first light-splitting element guides the red beam, the green beam, the blue beam, and the first supplementary beam to be transmitted to the light-uniforming element. The light-uniforming element combines the red beam, the green beam, the blue beam, and the first supplementary beam from the first light-splitting element into the illumination beam. The first supplementary beam is a red supplementary beam or a blue supplementary beam, and the illumination system includes at least five light-emitting elements.

To achieve one, part, or all of the above-mentioned purposes or other purposes, the disclosure provides a projection apparatus including an illumination system, at least one light valve, and a projection lens. The illumination system is configured to provide an illumination beam. The illumination system includes a red light source, a green light source, a blue light source, a first supplementary light source, a first X-shaped light-splitting assembly, a first light-splitting element, and a light-uniforming element. The red light source provides a red beam. The green light source provides a green beam. The blue light source provides a blue beam. The first supplementary light source provides a first supplementary beam. The first X-shaped light-splitting assembly guides the first supplementary beam and the blue beam to be transmitted to the first light-splitting element. The first light-splitting element guides the red beam, the green beam, the blue beam, and the first supplementary beam to be transmitted to the light-uniforming element. The light-uniforming element combines the red beam, the green beam, the blue beam, and the first supplementary beam from the first light-splitting element into the illumination beam. The at least one light valve is disposed on a transmission path of the illumination beam and converts the illumination beam into an image beam. The projection lens is disposed on a transmission path of the image beam and projects the image beam out of the projection apparatus. The first supplementary beam is a red supplementary beam or a blue supplementary beam, and the illumination system includes at least five light-emitting elements.

Based on the above, the embodiments of the disclosure have at least one of the following advantages or effects. In the illumination system and the projection apparatus of the disclosure, the illumination system includes the red light source, the green light source, the blue light source, the first supplementary light source, the first X-shaped light-splitting assembly, the first light-splitting element, and the light-uniforming element. The first supplementary beam provided by the first supplementary light source is a red supplementary beam or a blue supplementary beam, and the illumination system includes at least five light-emitting elements. Accordingly, compared to the conventional approach, with the configuration of the first X-shaped light-splitting assembly, more light-emitting elements can be provided to achieve a light-combining system which combines five or more paths of light sources, and the brightness of the illumination system can be improved. In addition, the color quality of the illumination system can be improved by using light of a different wavelength range provided by the first supplementary light source.

Other objectives, features and advantages of the disclosure will be further understood from the further technological features disclosed by the embodiments of the disclosure wherein there are shown and described exemplary embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the exemplary embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
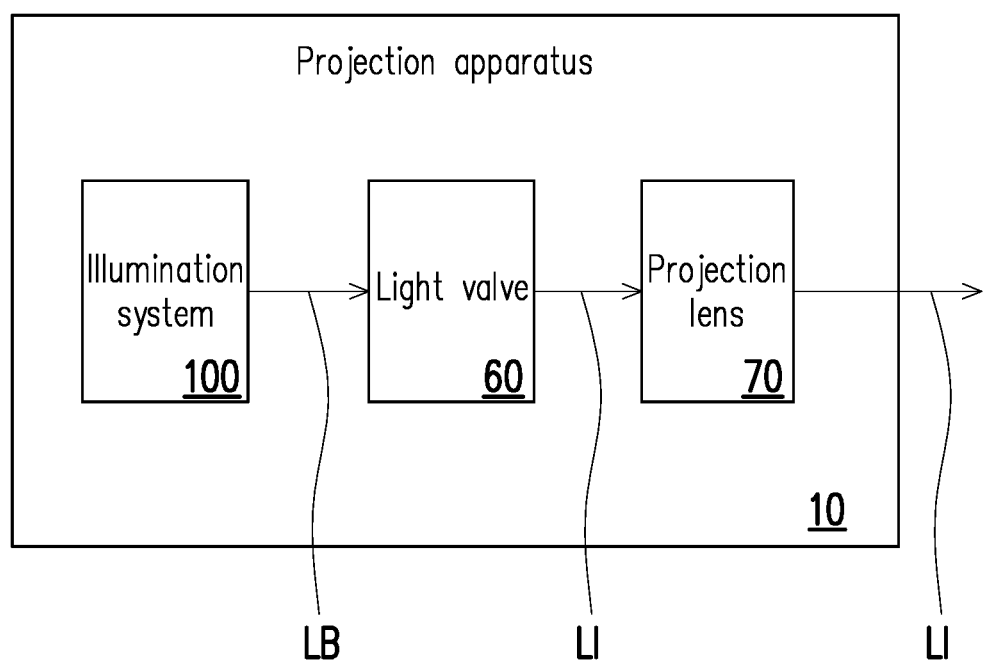
FIG. 1 is a schematic view of a projection apparatus according to an embodiment of the disclosure.

FIG. 1 is a schematic view of a projection apparatus according to an embodiment of the disclosure. Referring to FIG. 1, this embodiment provides a projection apparatus 10 including an illumination system 100, at least one light valve 60, and a projection lens 70. The illumination system 100 provides an illumination beam LB. The at least one light valve 60 is disposed on the transmission path of the illumination beam LB and converts the illumination beam LB into an image beam LI. The projection lens 70 is disposed on the transmission path of the image beam LI to project the image beam LI out of the projection apparatus 10 to a projection target (not shown) such as a screen or a wall.

The light valve 60 is, for example, a reflective light modulator such as a liquid-crystal-on-silicon panel (LCoS panel) or a digital micro-mirror device (DMD). In some embodiments, the light valve 60 may also be a transmissive light modulator such as a transparent liquid crystal panel, an electro-optical modulator, a magneto-optic modulator, or an acousto-optic modulator (AOM). The disclosure does not specifically limit the form and type of the light valve 60. The detailed steps and implementation of the method for the light valve 60 to convert the illumination beam LB into the image beam LI may be sufficiently taught, suggested, and described in the common knowledge in the art and thus will not be repeatedly described herein. In this embodiment, the number of the light valve 60 is one; namely, the projection apparatus 10 may be a projection apparatus including one single digital micro-mirror device, for example. However, in other embodiments, the light valve 60 may be plural, and the disclosure is not limited thereto.

The projection lens 70 includes, for example, a combination of one or more optical lenses having refractive power, including, for example, various combinations of non-planar lenses such as a biconcave lens, a biconvex lens, a concave-convex lens, a convex-concave lens, a plano-convex lens, and a plano-concave lens. In an embodiment, the projection lens 70 may further include a planar optical lens and project the image beam LI from the light valve 60 to the projection target by reflection. The disclosure does not specifically limit the form and type of the projection lens 70.

Figure 2:
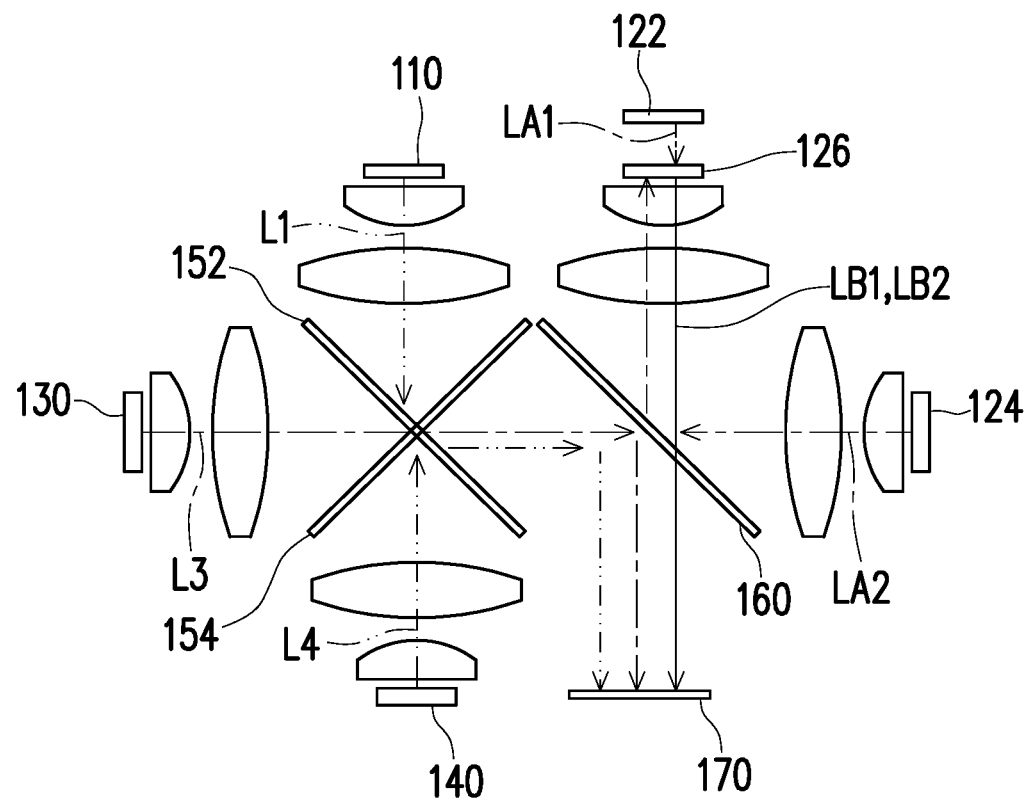
FIG. 2 is a schematic view of an illumination system according to an embodiment of the disclosure.

FIG. 2 is a schematic view of an illumination system according to an embodiment of the disclosure. Referring to FIG. 2, the illumination system 100 provides an illumination beam LB. Specifically, the illumination system 100 includes a red light source 110, a green light source 120, a blue light source 130, a first supplementary light source 140, a first X-shaped light-splitting assembly 150, a first light-splitting element 160, and a light-uniforming element 170. In this embodiment, the illumination system 100 may further optionally be provided with optical elements such as a wavelength conversion element, an optical lens, and a filter to guide beams and provide lights of different wavelengths as the source of the image light. However, the disclosure does not specifically limit the type or form of the illumination system 100. In addition, the illumination system 100 includes at least five light-emitting elements.

The red light source 110 provides a red beam L1, the green light source 120 provides a green beam L2, the blue light source 130 provides a blue beam L3, and the first supplementary light source 140 provides a first supplementary beam L4. In this embodiment, the red light source 110 includes, for example, one or more red light-emitting elements, and the light-emitting element is, for example, a light-emitting diode or a laser diode. The blue light source 130 includes, for example, one or more blue light-emitting elements, and the light-emitting element is, for example, a light-emitting diode or a laser diode. In this embodiment, the green light source 120 includes a first excitation light-emitting element 122, a second excitation light-emitting element 124, and a wavelength conversion element 126. For example, the first excitation light-emitting element 122 and the second excitation light-emitting element 124 are, for example, both blue light-emitting diodes or blue laser diodes, and the wavelength conversion element 126 includes, for example, a phosphor layer capable of exciting a green beam. Specifically, the first excitation light-emitting element 122 provides a blue-color first excitation beam LA1 to the wavelength conversion element 126 to be converted into a first green beam LB1. The second excitation light-emitting element 124 provides a blue-color second excitation beam LA2 to the first light-splitting element 160, and the second excitation beam LA2 is reflected by the first light-splitting element 160 to the wavelength conversion element 126 to be converted into a second green beam LB2. Finally, the first green beam LB1 and the second green beam LB2 form the green beam L2. In other words, in this embodiment, the green beam L2 is converted from two blue light sources. In this embodiment, for example, the wavelength conversion element 126 is provided with a light-splitter (not shown) on a surface facing the first excitation light-emitting element 122 to allow blue light to pass through and reflect green light. The blue-color first excitation beam LA1 provided by the first excitation light-emitting element 122 passes through the light-splitter and is then converted into the first green beam LB1 by the wavelength conversion element 126. A portion of the first green beam LB1 is transmitted toward the first light-splitting element 160, and another portion is transmitted toward the light-splitter and then reflected by the light-splitter to be transmitted toward the first light-splitting element 160. The blue-color second excitation beam LA2 provided by the second excitation light-emitting element 124 is reflected by the first light-splitting element 160 to the wavelength conversion element 126 to be converted into the second green beam LB2. A portion of the second green beam LB2 is transmitted toward the first light-splitting element 160, and another portion is transmitted toward the light-splitter and then reflected by the light-splitter to be transmitted toward the first light-splitting element 160. Accordingly, both the first green beam LB1 and the second green beam LB2 can be guided to the first light-splitting element 160. Therefore, the light intensity of the green beam L2 in the illumination system 100 can be increased. However, in other embodiments, the above light sources may all be laser diodes or may be a combination of light-emitting diodes and laser diodes, and the disclosure is not limited thereto.

On the other hand, the first supplementary light source 140 is, for example, a red light-emitting element or a blue light-emitting element. In other words, the first supplementary beam L4 provided by the first supplementary light source 140 is a red supplementary beam or a blue supplementary beam. In this embodiment, the first supplementary light source 140 is a red light-emitting diode or a red laser diode, so the provided first supplementary beam L4 is a red supplementary beam. Specifically, the wavelength of the first supplementary beam L4 (i.e., a red supplementary beam) is in the range of 630 nm to 640 nm, and the wavelength of the red beam L1 provided by the red light source 110 is in the range of 590 nm to 630 nm. The wavelength ranges of the red beam L1 and the first supplementary beam L4 are different, and the peak wavelength of the red beam L1 is less than the peak wavelength of the first supplementary beam L4.

Figure 3:
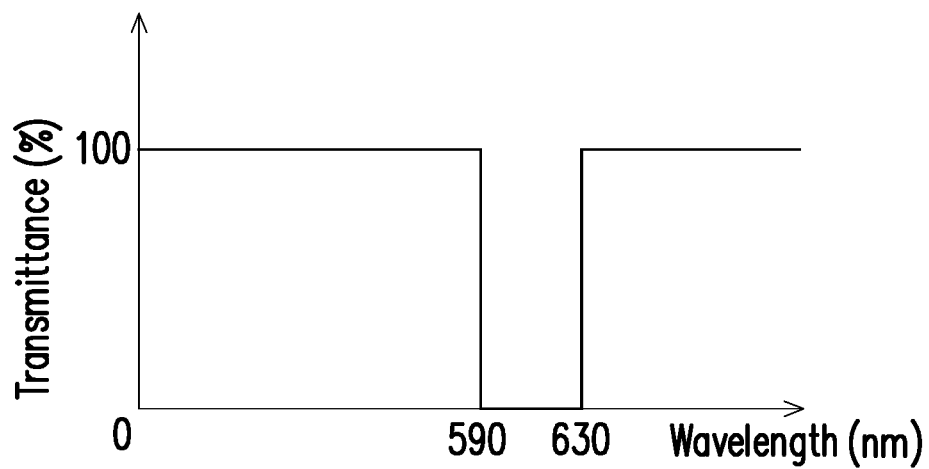
FIG. 3 is a transmittance versus wavelength graph of a first sub-light-splitting element of a first X-shaped light-splitting assembly in the illumination system of FIG. 2.
Figure 4:
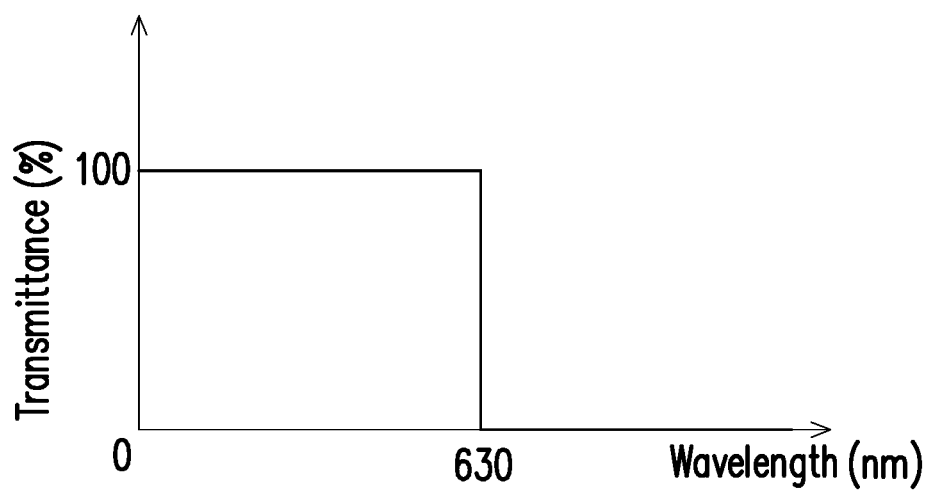
FIG. 4 is a transmittance versus wavelength graph of a second sub-light-splitting element of the first X-shaped light-splitting assembly in the illumination system of FIG. 2.

FIG. 3 is a transmittance versus wavelength graph of a first sub-light-splitting element of the first X-shaped light-splitting assembly in the illumination system of FIG. 2. FIG. 4 is a transmittance versus wavelength graph of a second sub-light-splitting element of the first X-shaped light-splitting assembly in the illumination system of FIG. 2. Referring to FIG. 2 to FIG. 4 at the same time, the first X-shaped light-splitting assembly 150 guides the first supplementary beam L4 and the blue beam L3 to the first light-splitting element 160. Specifically, in this embodiment, the first X-shaped light-splitting assembly 150 includes a first sub-light-splitting element 152 and a second sub-light-splitting element 154 which are in a crossed configuration; namely, the first sub-light-splitting element 152 and the second sub-light-splitting element 154 form an X-shaped assembly. Moreover, the first X-shaped light-splitting assembly 150 is located between the first light-splitting element 160 and the blue light source 130. The first sub-light-splitting element 152 reflects the red beam L1 and allows the blue beam L3 and the first supplementary beam L4 to pass through. In this embodiment, the first supplementary beam L4 is a red light having a wavelength in the range of 630 nm to 640 nm, and the peak wavelength of the first supplementary beam L4 is greater than the peak wavelength of the red beam L1. In other words, the first sub-light-splitting element 152 has a transmittance of 0% with respect to light having a wavelength in the range of 590 nm to 630 nm and has a transmittance of 100% with respect to light having a wavelength less than 590 nm or greater than 630 nm, as shown in FIG. 3. On the other hand, the second sub-light-splitting element 154 reflects the first supplementary beam L4 and allows the red beam L1 and the blue beam L3 to pass through. In other words, the second sub-light-splitting element 154 has a transmittance of 0% with respect to light having a wavelength greater than 630 nm and has a transmittance of 100% with respect to light having a wavelength less than 630 nm, as shown in FIG. 4.

Referring to FIG. 2 again, the first light-splitting element 160 guides the red beam L1, the green beam L2, the blue beam L3, and the first supplementary beam L4 to be transmitted to the light-uniforming element 170. Specifically, in this embodiment, the first light-splitting element 160 reflects the red beam L1, the blue beam L3, and the first supplementary beam L4 and allows the green beam L2 to pass through. It is noted that, regarding the light combination, through arrangement, the red beam L1 and the first supplementary beam L4 may be adjusted to be slightly misaligned to further disperse the thermal energy of the illumination system 100.

The light-uniforming element 170 combines the red beam L1, the green beam L2, the blue beam L3, and the first supplementary beam L4 from the first light-splitting element 160 into the illumination beam LB. The light-uniforming element 170 is configured to adjust a light spot pattern of the illumination beam LB so that the light spot pattern of the illumination beam LB can be in line with the shape (e.g., rectangular) of the effective working region of the light valve 60, and each part of the light spot can have consistent or similar light intensity to uniform the light intensity of the illumination beam LB. In this embodiment, the light-uniforming element 170 is, for example, an integration rod. However, in other embodiments, the light-uniforming element 170 may also be an optical element in another appropriate form, such as a lens array (fly eye lens array), and the disclosure is not limited thereto.

Accordingly, with the configuration of the first X-shaped light-splitting assembly 150, compared to the conventional approach, the illumination system 100 of this embodiment can be provided with more light-emitting elements to achieve an illumination system 100 combining five paths of light sources (e.g., the first excitation light-emitting element 122, the second excitation light-emitting element 124, the red light source 110, the blue light source 130, and the first supplementary light source 140) and can improve the brightness of the illumination system 100. In addition, the color quality of the illumination system 100 can be improved by using light of a different wavelength range provided by the first supplementary light source 140.

Figure 5:
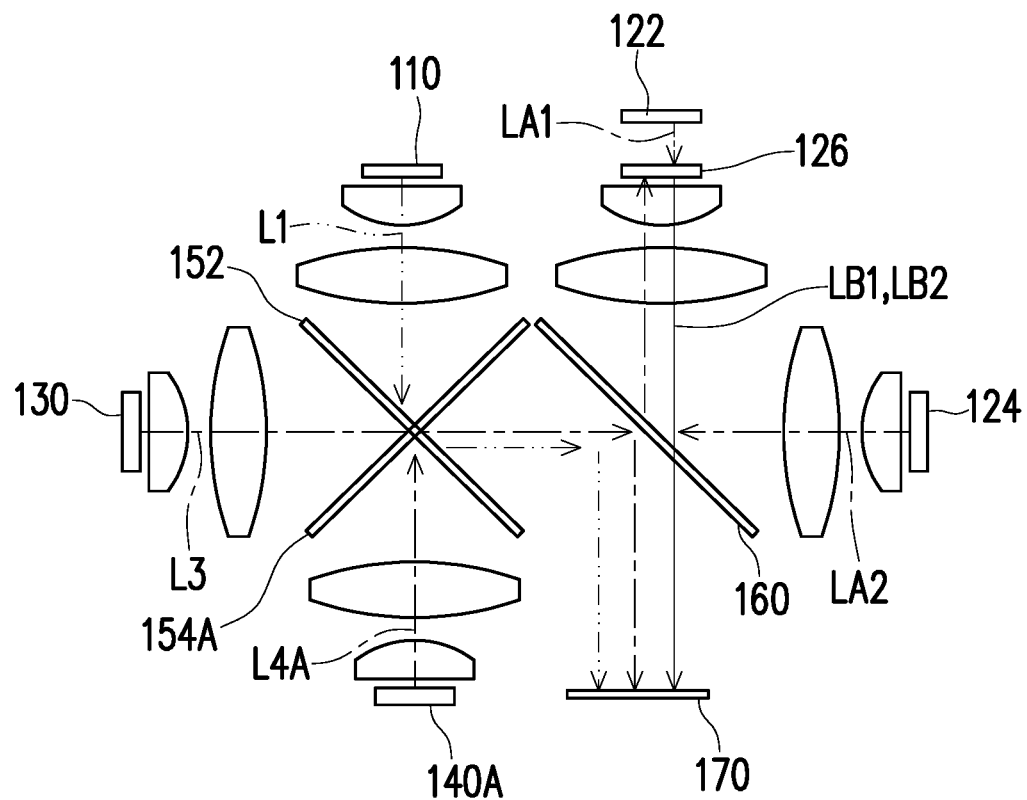
FIG. 5 is a schematic view of an illumination system according to another embodiment of the disclosure.

FIG. 5 is a schematic view of an illumination system according to another embodiment of the disclosure. Referring to FIG. 5, an illumination system 100A of this embodiment is similar to the illumination system 100 shown in FIG. 2. The difference between the two lies in that, in this embodiment, a first supplementary light source 140A is a blue light-emitting diode or a blue laser diode, so a first supplementary beam L4A provided is a blue supplementary beam.

Specifically, the wavelength of the first supplementary beam L4A (i.e., a blue supplementary beam) is in the range of 430 nm to 445 nm, and the wavelength of the blue beam L3 provided by the blue light source 130 is in the range of 450 nm to 480 nm. The wavelength ranges of the blue beam L3 and the first supplementary beam L4A are different, and the peak wavelength of the blue beam L3 is greater than the peak wavelength of the first supplementary beam L4A.

Figure 6:
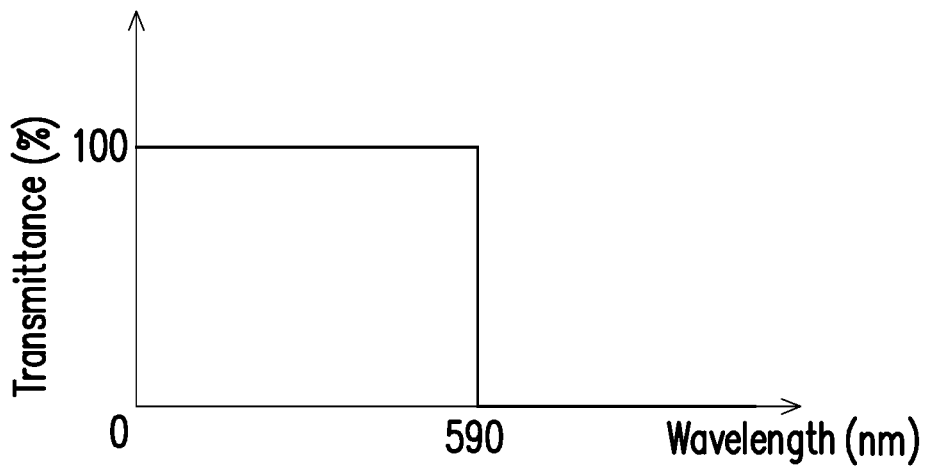
FIG. 6 is a transmittance versus wavelength graph of a first sub-light-splitting element of a first X-shaped light-splitting assembly in the illumination system of FIG. 5.
Figure 7:
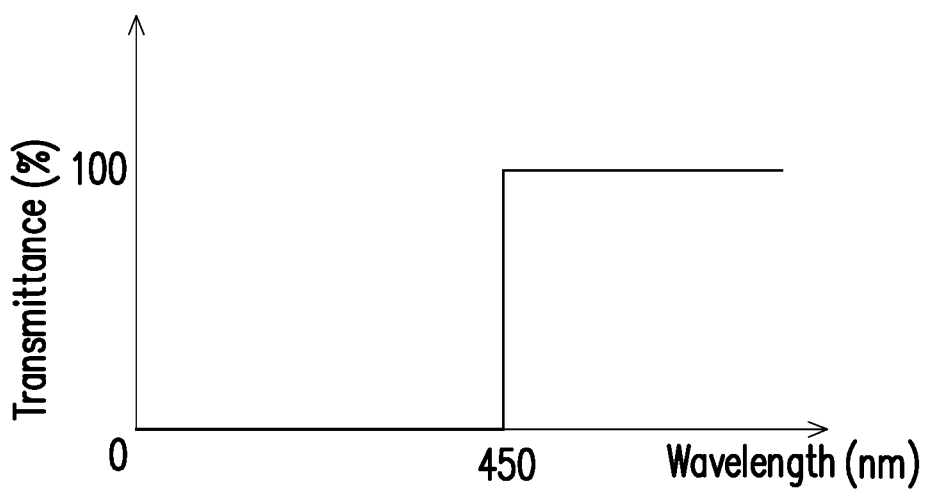
FIG. 7 is a transmittance versus wavelength graph of a second sub-light-splitting element of the first X-shaped light-splitting assembly in the illumination system of FIG. 5.

FIG. 6 is a transmittance versus wavelength graph of a first sub-light-splitting element of a first X-shaped light-splitting assembly in the illumination system of FIG. 5. FIG. 7 is a transmittance versus wavelength graph of a second sub-light-splitting element of the first X-shaped light-splitting assembly in the illumination system of FIG. 5. Referring to FIG. 5 to FIG. 7 at the same time, in this embodiment, a first sub-light-splitting element 152 of a first X-shaped light-splitting assembly 150A reflects the red beam L1 and allows the blue beam L3 and the first supplementary beam L4A to pass through. In this embodiment, the first supplementary beam L4A is a blue light having a wavelength in the range of 430 nm to 445 nm, and the peak wavelength of the first supplementary beam L4A is less than the peak wavelength of the blue beam L3. In other words, the first sub-light-splitting element 152 has a transmittance of 0% with respect to light having a wavelength greater than 590 nm and has a transmittance of 100% with respect to light having a wavelength less than 590 nm, as shown in FIG. 6. However, the first sub-light-splitting element 152 disclosed in the embodiment of FIG. 2 may also apply here, and the disclosure is not limited thereto. On the other hand, the second sub-light-splitting element 154A reflects the first supplementary beam L4A and allows the red beam L1 and the blue beam L3 to pass through. In other words, the second sub-light-splitting element 154A has a transmittance of 0% with respect to light having a wavelength less than 450 nm and has a transmittance of 100% with respect to light having a wavelength greater than 450 nm, as shown in FIG. 7.

Accordingly, with the configuration of the first X-shaped light-splitting assembly 150A, compared to the conventional approach, the illumination system 100A of this embodiment can be provided with more light-emitting elements to achieve an illumination system 100A combining five paths of light sources and can increase the brightness of the illumination system 100A. In addition, the color quality of the illumination system 100A can be improved by using light of a different wavelength range provided by the first supplementary light source 140A. It is noted that, regarding light combination, through arrangement, the red beam L1 and the first supplementary beam L4A may be adjusted to be slightly misaligned to further disperse the thermal energy of the illumination system 100A.

Figure 8:
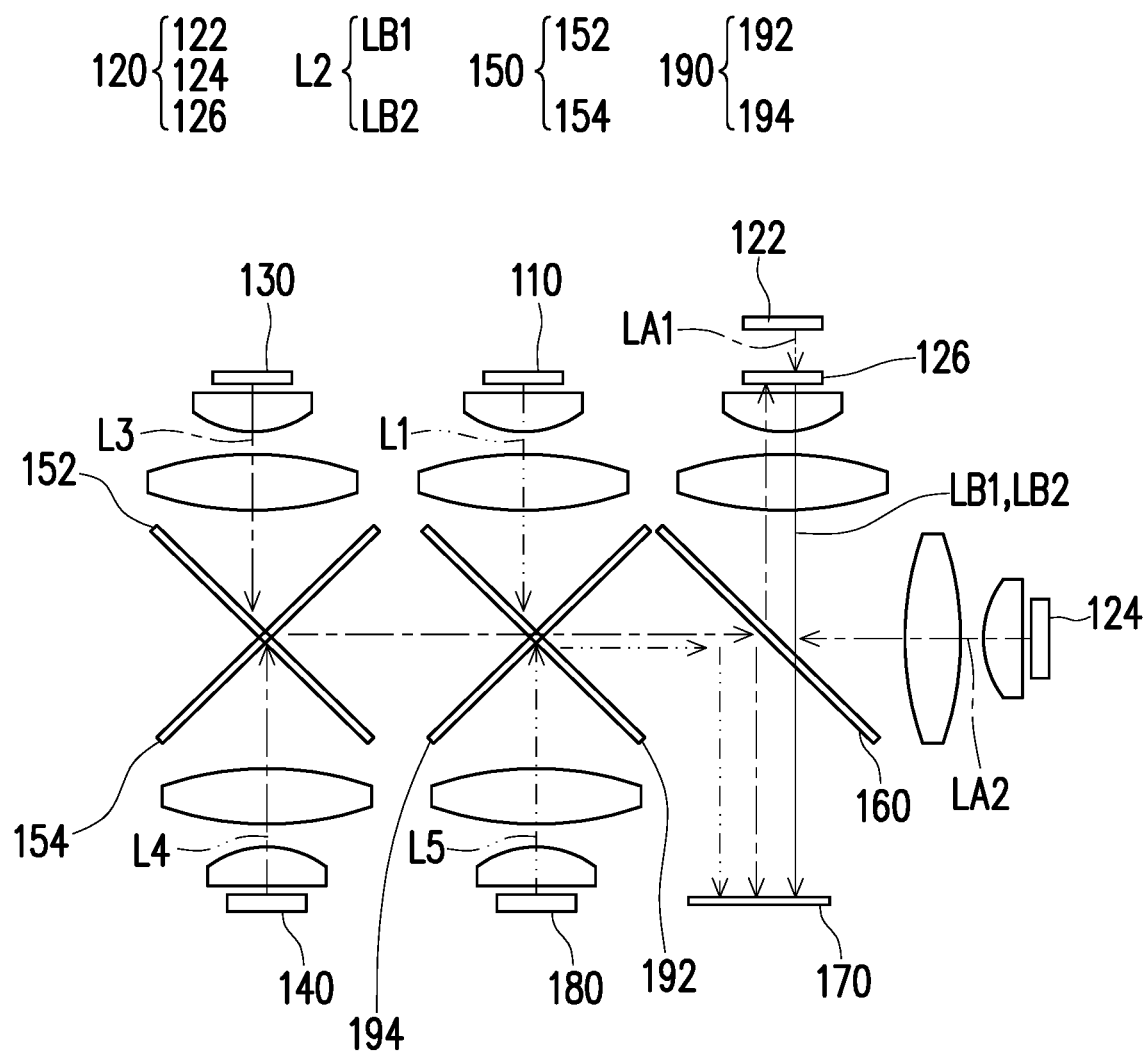
FIG. 8 is a schematic view of an illumination system according to another embodiment of the disclosure.

FIG. 8 is a schematic view of an illumination system according to another embodiment of the disclosure. Referring to FIG. 8, an illumination system 100B of this embodiment is similar to the illumination system 100 shown in FIG. 2. The difference between the two lies in that, in this embodiment, the illumination system 100B further includes a second supplementary light source 180 and a second X-shaped light-splitting assembly 190. The second supplementary light source 180 provides a second supplementary beam L5, and the second supplementary beam L5 and the first supplementary beam L4 have different wavelength ranges. Specifically, the first supplementary beam L4 is a blue supplementary beam and has a wavelength in the range of 430 nm to 445 nm, and the second supplementary beam L5 is a red supplementary beam and has a wavelength in the range of 630 nm to 640 nm.

Figure 9:
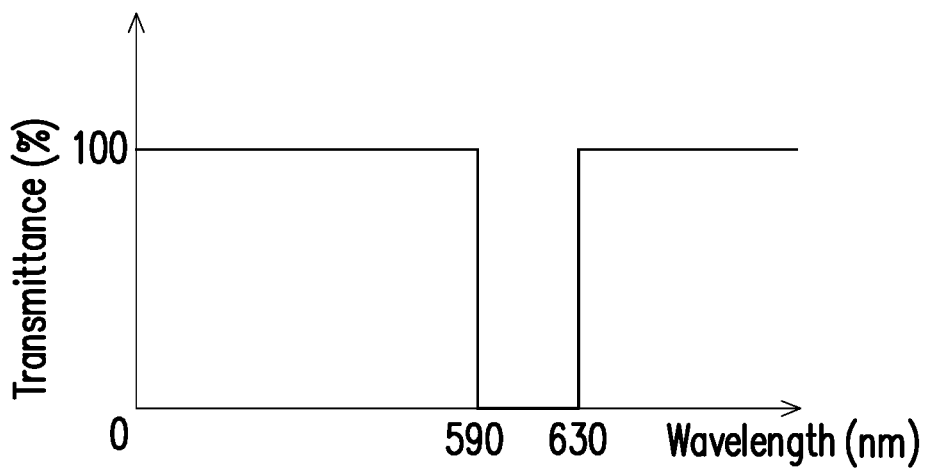
FIG. 9 is a transmittance versus wavelength graph of a third sub-light-splitting element of a second X-shaped light-splitting assembly in the illumination system of FIG. 8.
Figure 10:
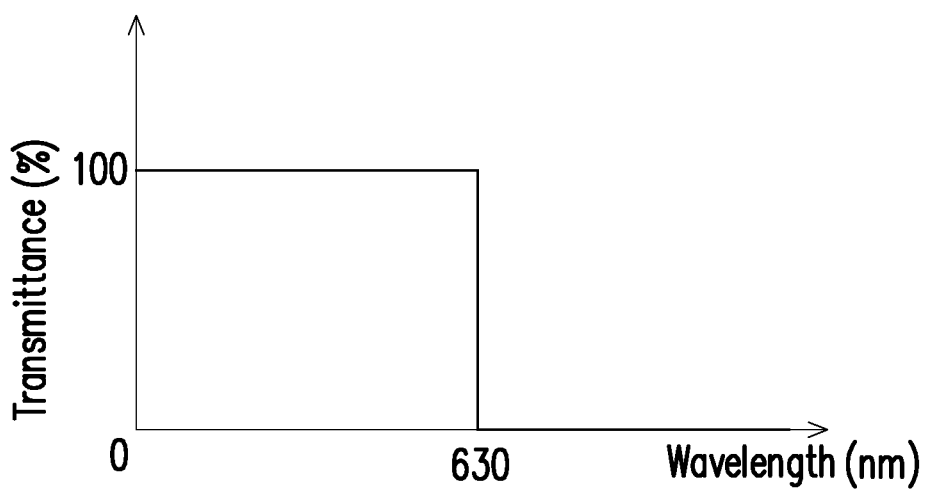
FIG. 10 is a transmittance versus wavelength graph of a fourth sub-light-splitting element of the second X-shaped light-splitting assembly in the illumination system of FIG. 8.

FIG. 9 is a transmittance versus wavelength graph of a third sub-light-splitting element of the second X-shaped light-splitting assembly in the illumination system of FIG. 8. FIG. 10 is a transmittance versus wavelength graph of a fourth sub-light-splitting element of the second X-shaped light-splitting assembly in the illumination system of FIG. 8. Referring to FIG. 8 to FIG. 10 at the same time, the first sub-light-splitting element 152 may be the light-splitting element capable of reflecting the blue beam L3 as described in the above embodiment, and the second sub-light-splitting element 154 may be the light-splitting element capable of reflecting the blue-color first supplementary beam L4 as described in the above embodiment. The second X-shaped light-splitting assembly 190 is disposed between the first X-shaped light-splitting assembly 150 and the first light-splitting element 160 and guides the red beam L1, the blue beam L3, the first supplementary beam L4, and the second supplementary beam L5 to be transmitted to the first light-splitting element 160. In this embodiment, the second X-shaped light-splitting assembly 190 includes a third sub-light-splitting element 192 and a fourth sub-light-splitting element 194 which are in a crossed configuration; namely, the third sub-light-splitting element 192 and the fourth sub-light-splitting element 194 form an X-shaped assembly. The third sub-light-splitting element 192 reflects the red beam L1 and allows the blue beam L3, the first supplementary beam L4, and the second supplementary beam L5 to pass through. In other words, the third sub-light-splitting element 192 has a transmittance of 0% with respect to light having a wavelength in the range of 590 nm to 630 nm and has a transmittance of 100% with respect to light having a wavelength less than 590 nm or greater than 630 nm, as shown in FIG. 9. The fourth sub-light-splitting element 194 reflects the red-color second supplementary beam L5 and allows the red beam L1, the blue beam L3, and the first supplementary beam L4 to pass through. In other words, the fourth sub-light-splitting element 194 has a transmittance of 0% with respect to light having a wavelength greater than 630 nm and has a transmittance of 100% with respect to light having a wavelength less than 630 nm, as shown in FIG. 10.

Accordingly, with the configuration of the first X-shaped light-splitting assembly 150 and the second X-shaped light-splitting assembly 190, compared to the conventional approach, the illumination system 100B of this embodiment can be provided with more light-emitting elements to achieve an illumination system 100B combining six paths of light sources (e.g., the first excitation light-emitting element 122, the second excitation light-emitting element 124, the red light source 110, the blue light source 130, the first supplementary light source 140, and the second supplementary light source 180) and can increase the brightness of the illumination system 100B. In addition, the color quality of the illumination system 100B can be improved by using lights of different wavelength ranges respectively provided by the first supplementary light source 140 and the second supplementary light source 180. It is noted that, regarding light combination, through arrangement, the blue beam L3 and the first supplementary beam L4 may be adjusted to be slightly misaligned, and the red beam L1 and the second supplementary beam L5 may be adjusted to be slightly misaligned to further disperse the thermal energy of the illumination system 100B.

Figure 11:
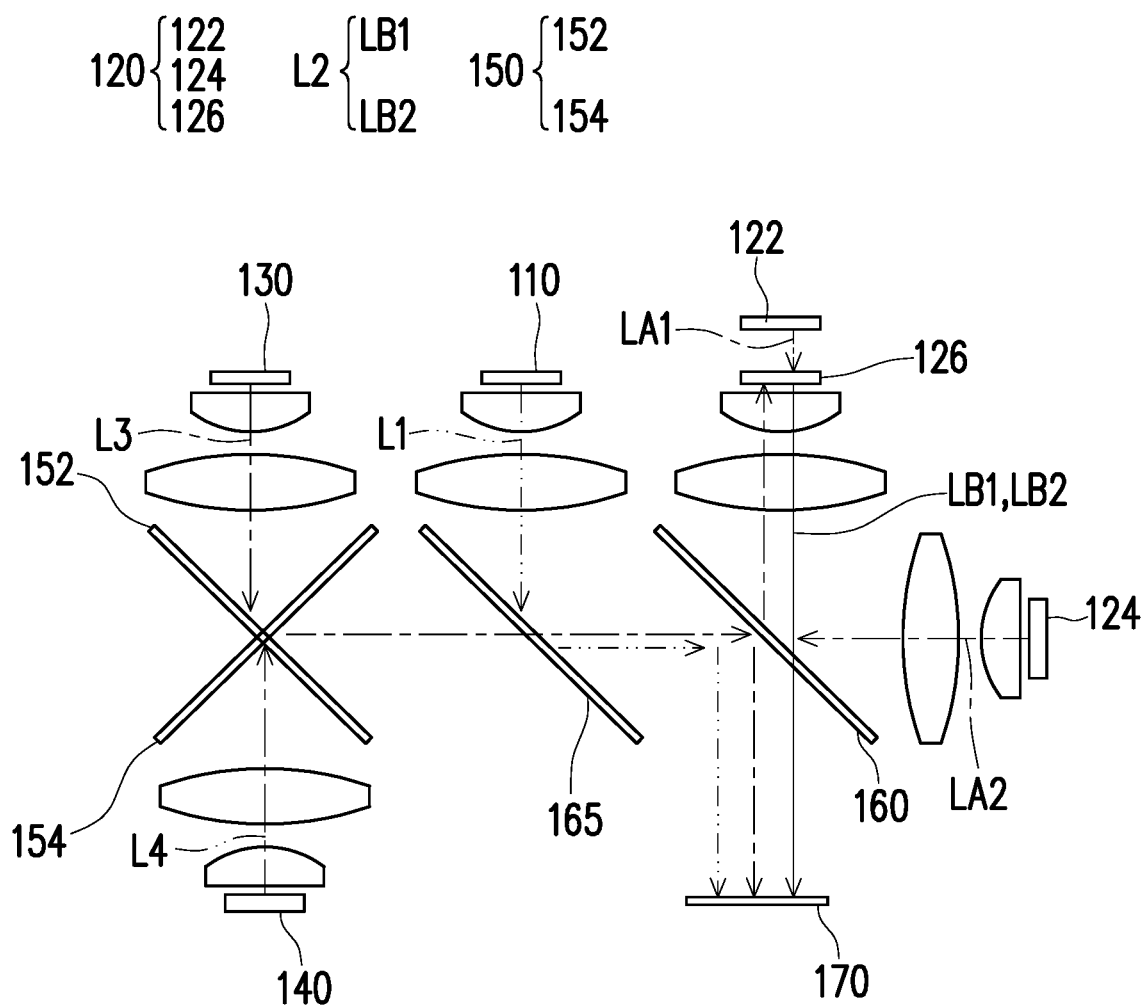
FIG. 11 is a schematic view of an illumination system according to another embodiment of the disclosure.

FIG. 11 is a schematic view of an illumination system according to another embodiment of the disclosure. Referring to FIG. 11, an illumination system 100C of this embodiment is similar to the illumination system 100B shown in FIG. 8. The difference between the two lies in that, in this embodiment, the illumination system 100C omits the configuration of the second supplementary light source 180 in FIG. 8, and the second X-shaped light-splitting assembly 190 shown in FIG. 8 is replaced by a second light-splitting element 165. Specifically, the second light-splitting element 165 is disposed between the first X-shaped light-splitting assembly 150 and the first light-splitting element 160 and guides the red beam L1, the blue beam L3, and the first supplementary beam L4 to be transmitted to the first light-splitting element 160. The first supplementary beam L4 is a blue supplementary beam and has a wavelength in the range of 430 nm to 445 nm.

Accordingly, with the configuration of the first X-shaped light-splitting assembly 150 and the second light-splitting element 165, compared to the conventional approach, the illumination system 100C of this embodiment can be provided with more light-emitting elements to achieve an illumination system 100C combining five paths of light sources (e.g., the first excitation light-emitting element 122, the second excitation light-emitting element 124, the red light source 110, the blue light source 130, and the first supplementary light source 140) and can increase the brightness of the illumination system 100C. In addition, the color quality of the illumination system 100C can be improved by using light of a different wavelength range provided by the first supplementary light source 140.

In summary of the above, in the illumination system and the projection apparatus of the disclosure, the illumination system includes the red light source, the green light source, the blue light source, the first supplementary light source, the first X-shaped light-splitting assembly, the first light-splitting element, and the light-uniforming element. The first supplementary beam provided by the first supplementary light source is a red supplementary beam or a blue supplementary beam, and the illumination system includes at least five light-emitting elements. Accordingly, compared to the conventional approach, with the configuration of the first X-shaped light-splitting assembly, more light-emitting elements can be provided to achieve a light-combining system which combines five or more paths of light sources, and the brightness of the illumination system can be improved. In addition, the color quality of the illumination system can be improved by using light of a different wavelength range provided by the first supplementary light source.

The foregoing description of the exemplary embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particular exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An illumination system configured to provide an illumination beam, the illumination system comprising a red light source, a green light source, a blue light source, a first supplementary light source, a first X-shaped light-splitting assembly, a first light-splitting element, and a light-uniforming element, wherein
    the red light source provides a red beam,
    the green light source provides a green beam,
    the blue light source provides a blue beam,
    the first supplementary light source provides a first supplementary beam,
    the first X-shaped light-splitting assembly is configured to reflect the first supplementary beam and the red beam to the first light-splitting element, and is configured to allow the blue beam to pass through to the first light-splitting element,
    the first light-splitting element is configured to guide the red beam, the green beam, the blue beam, and the first supplementary beam to be transmitted to the light-uniforming element, and
    the light-uniforming element is configured to provide the red beam, the green beam, the blue beam, and the first supplementary beam from the first light-splitting element to form the illumination beam,
    wherein the first supplementary beam is a red supplementary beam or a blue supplementary beam, and the illumination system comprises at least five light-emitting elements.

2. The illumination system according to claim 1, wherein the green light source comprises a first excitation light-emitting element, a second excitation light-emitting element, and a wavelength conversion element, wherein the first excitation light-emitting element provides a first excitation beam to the wavelength conversion element to be converted into a first green beam, the second excitation light-emitting element provides a second excitation beam, the second excitation beam is transmitted to the wavelength conversion element via the first light-splitting element to be converted into a second green beam, and the green beam comprises the first green beam and the second green beam.

3. The illumination system according to claim 1, wherein the first light-splitting element is configured to reflect the red beam, the blue beam, and the first supplementary beam and is configured to allow the green beam to pass through.

4. The illumination system according to claim 1, wherein the first supplementary beam is the red supplementary beam and has a wavelength in a range of 630 nm to 640 nm, and the red beam has a wavelength in a range of 590 nm to 630 nm.

5. The illumination system according to claim 1, wherein the first supplementary beam is the blue supplementary beam and has a wavelength in a range of 430 nm to 445 nm, and the blue beam has a wavelength in a range of 450 nm to 480 nm.

6. The illumination system according to claim 1, wherein the first X-shaped light-splitting assembly comprises a first sub-light-splitting element and a second sub-light-splitting element which are in a crossed configuration, the first sub-light-splitting element is configured to allow the first supplementary beam to pass through, and the second sub-light-splitting element is configured to reflect the first supplementary beam.

7. An illumination system configured to provide an illumination beam, the illumination system comprising a red light source, a green light source, a blue light source, a first supplementary light source, a first X-shaped light-splitting assembly, a first light-splitting element a light-uniforming element, wherein
    the red light source provides a red beam,
    the green light source provides a green beam,
    the blue light source provides a blue beam,
    the first supplementary light source provides a first supplementary beam,
    the first X-shaped light-splitting assembly is configured to guide the first supplementary beam and the blue beam to be transmitted to the first light-splitting element,
    the first light-splitting element is configured to guide the red beam, the green beam, the blue beam, and the first supplementary beam to be transmitted to the light-uniforming element, and
    the light-uniforming element is configured to provide the red beam, the green beam, the blue beam, and the first supplementary beam from the first light-splitting element to form the illumination beam,
    wherein the first supplementary beam is a red supplementary beam or a blue supplementary beam, and the illumination system comprises at least five light-emitting elements,
    wherein the illumination system further comprising a second supplementary light source and a second X-shaped light-splitting assembly, wherein
    the second supplementary light source provides a second supplementary beam, and the second supplementary beam and the first supplementary beam have different wavelength ranges, and
    the second X-shaped light-splitting assembly is disposed between the first X-shaped light-splitting assembly and the first light-splitting element and is configured to guide the red beam, the blue beam, the first supplementary beam, and the second supplementary beam to be transmitted to the first light-splitting element.

8. The illumination system according to claim 7, wherein the first supplementary beam is the blue supplementary beam and has a wavelength in a range of 430 nm to 445 nm, the blue beam has a wavelength in a range of 450 nm to 480 nm, the second supplementary beam has a wavelength in a range of 630 nm to 640 nm, and the red beam has a wavelength in a range of 590 nm to 630 nm.

9. The illumination system according to claim 7, wherein the second X-shaped light-splitting assembly comprises a third sub-light-splitting element and a fourth sub-light-splitting element which are in a crossed configuration, the third sub-light-splitting element is configured to allow the second supplementary beam to pass through, and the fourth sub-light-splitting element is configured to reflect the second supplementary beam.

10. A projection apparatus comprising an illumination system, at least one light valve, and a projection lens, wherein
    the illumination system is configured to provide an illumination beam and comprises a red light source, a green light source, a blue light source, a first supplementary light source, a first X-shaped light-splitting assembly, a first light-splitting element, and a light-uniforming element, wherein
    the red light source provides a red beam,
    the green light source provides a green beam,
    the blue light source provides a blue beam,
    the first supplementary light source provides a first supplementary beam,
    the first X-shaped light-splitting assembly is configured to reflect the first supplementary beam and the red beam to the first light-splitting element, and is configured to allow the blue beam to pass through to the first light-splitting element, the first light-splitting element is configured to guide the red beam, the green beam, the blue beam, and the first supplementary beam to be transmitted to the light-uniforming element, and the light-uniforming element is configured to provide the red beam, the green beam, the blue beam, and the first supplementary beam from the first light-splitting element to form the illumination beam, wherein the first supplementary beam is a red supplementary beam or a blue supplementary beam, and the illumination system comprises at least five light-emitting elements, the at least one light valve is disposed on a transmission path of the illumination beam and is configured to convert the illumination beam into an image beam, and the projection lens is disposed on a transmission path of the image beam and is configured to project the image beam out of the projection apparatus.

11. The projection apparatus according to claim 10, wherein the green light source comprises a first excitation light-emitting element, a second excitation light-emitting element, and a wavelength conversion element, wherein the first excitation light-emitting element provides a first excitation beam to the wavelength conversion element to be converted into a first green beam, the second excitation light-emitting element provides a second excitation beam, the second excitation beam is transmitted to the wavelength conversion element via the first light-splitting element to be converted into a second green beam, and the green beam comprises the first green beam and the second green beam.

12. The projection apparatus according to claim 10, wherein the first light-splitting element is configured to reflect the red beam, the blue beam, and the first supplementary beam and is configured to allow the green beam to pass through.

13. The projection apparatus according to claim 10, wherein the first supplementary beam is the red supplementary beam and has a wavelength in a range of 630 nm to 640 nm, and the red beam has a wavelength in a range of 590 nm to 630 nm.

14. The projection apparatus according to claim 10, wherein the first supplementary beam is the blue supplementary beam and has a wavelength in a range of 430 nm to 445 nm, and the blue beam has a wavelength in a range of 450 nm to 480 nm.

15. The projection apparatus according to claim 10, wherein the first X-shaped light-splitting assembly comprises a first sub-light-splitting element and a second sub-light-splitting element which are in a crossed configuration, the first sub-light-splitting element is configured to allow the first supplementary beam to pass through, and the second sub-light-splitting element is configured to reflect the first supplementary beam.

16. A projection apparatus comprising an illumination system, at least one light valve, and a projection lens, wherein the illumination system is configured to provide an illumination beam and comprises a red light source, a green light source, a blue light source, a first supplementary light source, a first X-shaped light-splitting assembly, a first light-splitting element, and a light-uniforming element, wherein the red light source provides a red beam, the green light source provides a green beam, the blue light source provides a blue beam, the first supplementary light source provides a first supplementary beam, the first X-shaped light-splitting assembly is configured to guide the first supplementary beam and the blue beam to be transmitted to the first light-splitting element, the first light-splitting element is configured to guide the red beam, the green beam, the blue beam, and the first supplementary beam to be transmitted to the light-uniforming element, and the light-uniforming element is configured to provide the red beam, the green beam, the blue beam, and the first supplementary beam from the first light-splitting element to form the illumination beam, wherein the first supplementary beam is a red supplementary beam or a blue supplementary beam, and the illumination system comprises at least five light-emitting elements, wherein the illumination system further comprises a second supplementary light source and a second X-shaped light-splitting assembly, wherein the second supplementary light source provides a second supplementary beam, and the second supplementary beam and the first supplementary beam have different wavelength ranges, and the second X-shaped light-splitting assembly is disposed between the first X-shaped light-splitting assembly and the first light-splitting element and is configured to guide the red beam, the blue beam, the first supplementary beam, and the second supplementary beam to be transmitted to the first light-splitting element, the at least one light valve is disposed on a transmission path of the illumination beam and is configured to convert the illumination beam into an image beam, and the projection lens is disposed on a transmission path of the image beam and is configured to project the image beam out of the projection apparatus.

17. The projection apparatus according to claim 16, wherein the first supplementary beam is the blue supplementary beam and has a wavelength in a range of 430 nm to 445 nm, the blue beam has a wavelength in a range of 450 nm to 480 nm, the second supplementary beam has a wavelength in a range of 630 nm to 640 nm, and the red beam has a wavelength in a range of 590 nm to 630 nm.

18. The projection apparatus according to claim 16, wherein the second X-shaped light-splitting assembly comprises a third sub-light-splitting element and a fourth sub-light-splitting element which are in a crossed configuration, the third sub-light-splitting element is configured to allow the second supplementary beam to pass through, and the fourth sub-light-splitting element is configured to reflect the second supplementary beam.

* * * * *